(12) United States Patent
Bock et al.

(10) Patent No.: US 11,945,334 B2
(45) Date of Patent: Apr. 2, 2024

(54) METHOD FOR DETERMINING A MAXIMUM VALUE FOR A PARAMETER RANGE OF A DRIVING OPERATION PARAMETER OF A MOTOR VEHICLE AND MOTOR VEHICLE

(71) Applicant: AUDI AG, Ingolstadt (DE)

(72) Inventors: Florian Bock, Nuremberg (DE); Michael Grabowski, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 250 days.

(21) Appl. No.: 17/385,200

(22) Filed: Jul. 26, 2021

(65) Prior Publication Data
US 2022/0161681 A1    May 26, 2022

(30) Foreign Application Priority Data
Nov. 24, 2020  (DE) .......................... 102020130993.7

(51) Int. Cl.
*B60K 35/00*  (2006.01)
*B60L 58/12*  (2019.01)
(Continued)

(52) U.S. Cl.
CPC ............. *B60L 58/12* (2019.02); *B60K 35/00* (2013.01); *B60W 60/001* (2020.02); *B60K 35/22* (2024.01);
(Continued)

(58) Field of Classification Search
None
See application file for complete search history.

(56) References Cited

U.S. PATENT DOCUMENTS

| 9,008,369 B2 * | 4/2015 | Schofield | G06V 20/588 |
| | | | 382/104 |
| 2011/0199199 A1 * | 8/2011 | Perkins | B60Q 1/525 |
| | | | 340/435 |

(Continued)

FOREIGN PATENT DOCUMENTS

| DE | 102009052853 A1 | 5/2011 |
| DE | 102017221829 B3 | 4/2019 |

(Continued)

OTHER PUBLICATIONS

German Examiation Report dated Jul. 6, 2021 in corresponding German Application No. 10 2020 130 993.7; 14 pages; Machine translation attached.

(Continued)

*Primary Examiner* — James M Mcpherson
(74) *Attorney, Agent, or Firm* — Maier & Maier, PLLC

(57) ABSTRACT

A method for determining a maximum value for a parameter range of a driving operation parameter of a motor vehicle. The motor vehicle includes a control device, at least one electric traction motor, an electric energy storage device which can be operated in an operating temperature range for operating the traction motor, and at least one temperature sensor for determining a temperature of the energy storage device. The control device determines the maximum value as a function of a current temperature of the energy storage device determined by the temperature sensor in such a manner that, after the approach of a destination known to the control device and/or after a journey over a predetermined distance with the driving operation parameter restricted by the maximum value of the parameter range, a predicted temperature of the energy storage device lies within a charging temperature range.

19 Claims, 1 Drawing Sheet

(51) Int. Cl.
*B60W 60/00* (2020.01)
*B60K 35/22* (2024.01)
*B60K 35/28* (2024.01)

(52) U.S. Cl.
CPC ........ *B60K 35/28* (2024.01); *B60K 2360/169* (2024.01); *B60L 2240/12* (2013.01); *B60L 2240/14* (2013.01); *B60L 2240/545* (2013.01); *B60L 2250/16* (2013.01); *B60W 2540/10* (2013.01)

(56) References Cited

U.S. PATENT DOCUMENTS

| | | | |
|---|---|---|---|
| 2012/0175948 A1* | 7/2012 | Kamijo | B60L 58/14 307/9.1 |
| 2014/0121866 A1 | 5/2014 | Dangler et al. | |
| 2016/0204478 A1* | 7/2016 | Iguchi | B60L 58/26 429/62 |
| 2016/0214490 A1* | 7/2016 | Soo | B60L 58/12 |
| 2020/0023750 A1* | 1/2020 | Fukami | B60L 58/25 |
| 2020/0047629 A1 | 2/2020 | Cho | |
| 2020/0062126 A1* | 2/2020 | Duan | G05D 1/0223 |
| 2020/0139986 A1 | 5/2020 | Hoshiya | |
| 2021/0188125 A1* | 6/2021 | Zhao | H01M 10/486 |
| 2021/0309118 A1* | 10/2021 | Nanbu | B60L 58/12 |
| 2022/0089061 A1* | 3/2022 | Farley | B60H 1/00385 |

FOREIGN PATENT DOCUMENTS

| | | |
|---|---|---|
| DE | 102019105813 A1 | 9/2020 |
| JP | 2016-220310 A | 12/2016 |
| WO | 2018/009448 A1 | 1/2018 |

OTHER PUBLICATIONS

Examination Report dated Sep. 12, 2023, in corresponding German Application No. 102020130993.7, 12 pages.

* cited by examiner

METHOD FOR DETERMINING A MAXIMUM VALUE FOR A PARAMETER RANGE OF A DRIVING OPERATION PARAMETER OF A MOTOR VEHICLE AND MOTOR VEHICLE

FIELD

The invention relates to a method for determining a maximum value for a parameter range of a driving operation parameter of a motor vehicle, wherein the motor vehicle comprises a control device, at least one electric traction motor, an electric energy storage device operable in an operating temperature range for operating the traction motor, and at least one temperature sensor for determining a temperature of the energy storage device. Furthermore, the invention relates to a motor vehicle.

BACKGROUND

Motor vehicles driven by an electric traction motor generally have an energy storage device in which electrical energy for operating the traction motor is stored. Depending on the amount of energy stored in the energy storage device, the motor vehicle has a range, which indicates how far the motor vehicle can be moved via the electric traction motor. For trips whose total length exceeds this range, it is known to plan driving routes with charging options along the way. In doing so, a driver of the motor vehicle can, for example, enter his destination in the motor vehicle, subsequently receiving, for example, a list of suggestions for places where the motor vehicle can be charged in the course of the journey.

In order to influence the range, it is known to reduce the energy consumption of the motor vehicle by limiting operating parameters, in particular operating parameters of the electric traction motor. This can increase the range of the motor vehicle so that a further distance can be covered before a charging process has to take place. Various methods for operating electrically powered vehicles are known from the prior art.

DE 10 2009 052 853 A1 describes a method for estimating the range of a motor vehicle. There, a quantity of energy carried and detectable in the motor vehicle is taken into account, whereby a driver can set a limit for a maximum permissible driving speed and/or a maximum permissible acceleration and/or a maximum power for a comfort system. A computing device calculates and displays a range that is now possible on the basis of the limit and road profiles surrounding the motor vehicle and an amount of energy still available.

From US 2020/0139986 A1, a drive power control system for a motor vehicle comprising an electric motor and a battery is known. The drive power control system includes a control unit that determines an upper limit for an acceleration of the motor vehicle based on a maximum power that can be delivered from the energy storage device to the motor. By the control unit, a corrected acceleration change may be used instead of a reference acceleration change when the upper limit for acceleration is below a target acceleration.

US 2020/0047629 A1 describes a method for optimizing travel with an electrically driven vehicle. In this process, if the state of charge of the energy storage device is less than a predetermined state of charge, a speed corridor in which a predetermined destination can still be reached with the energy stored in the energy storage device is determined in a mode for saving energy. If this target does not correspond to the desired target, a charging station can be approached with the energy still available in the energy storage.

SUMMARY

The invention is based on the task of providing an improved method for determining a maximum value for a parameter range of a driving operation parameter of a motor vehicle, which in particular enables more efficient operation of the motor vehicle.

To solve this task, in a method of the type mentioned at the beginning, it is provided according to the invention that the control device determines the maximum value as a function of a current temperature of the energy storage device determined by the temperature sensor in such a way, in such a way that, after an approach to a destination known to the control device and/or after a journey over a predetermined distance with the driving operation parameter restricted by the maximum value of the parameter range, a predicted temperature of the energy storage device lies within a charging temperature range, wherein the charging temperature range is a subrange of the operating temperature range and comprising at least one temperature with a charging power maximum for charging the energy storage device.

The method enables the temperature of the energy storage device to be within the charging temperature range after driving to a destination and/or after driving over a predetermined distance, so that charging of the energy storage device at the destination or after covering the predetermined distance can take place with a temperature of the energy storage device that is favorable for the charging process. The duration of a charging process is determined by the power with which electrical energy can be transferred from the charging station to the electrical energy storage device and by the total amount of energy to be transferred for charging the energy storage device. Furthermore, the time required to charge the energy storage device also depends on the temperature of the energy storage device during charging, as this has a significant influence on the maximum possible charging power with which the energy storage device can be charged.

Advantageously, the method can avoid having to carry out the charging process with unfavorable battery temperatures, which may represent permissible operating temperatures of the energy storage device, but which may cause an increased charging time due to a temperature-related reduced charging power of the energy storage device. It is possible, for example, that an operating temperature range of an energy storage device designed as a traction battery is between −10° C. and 65° C., whereas a charging temperature range in which charging at a higher power is possible is for example between 10° C. and 50° C. or between 10° C. and 60° C. for the battery. It is possible that the charging temperature range has the same lower limit as the operating temperature range, wherein an upper limit of the charging temperature range is lower than an upper limit of the operating temperature range. To predict the temperature of the energy storage device at the destination or after driving the specified distance, a calculation rule and/or a model of the motor vehicle for predicting the temperature of the energy storage device as a function of the at least one driving operation parameter can for example be stored in the control device.

By charging the energy storage device with a higher charging power, charging at the destination or after covering the specified distance can take place more quickly. In this way, for example, during a journey that includes at least one stopover for charging the energy storage device, the total duration of the journey until reaching an end point can be advantageously reduced by charging with a high power and thus with a shorter duration. It may also be desirable for charging operations between several individual journeys if the charging duration for charging the energy storage device is as short as possible, for example if the driver subsequently intends to make a further journey with the motor vehicle after only a short break.

The destination at which the temperature of the energy storage device is within the charging temperature range can, for example, be entered by a user into the control device or a navigation device connected to the control device, so that the control device knows which destination is to be approached. The destination may be an end point of a trip or a journey. It is also possible that a stopover, in particular a charging stop, of a longer journey is used as the destination.

During operation of the motor vehicle, in particular during a longer journey of the motor vehicle, the battery temperature is predominantly dependent on the driving behavior of the driver. Adherence to the maximum value for the range of the driving operation parameter makes it possible to ensure that, during operation of the motor vehicle, the energy storage device does not heat up in such a way that it has a temperature that is unfavorable for charging at the destination or after covering the specified distance. In particular, by maintaining the determined maximum value, it is possible to avoid driving a route directly before reaching the destination and/or before the end of the specified route with a maximum possible engine output of the traction motor, as a result of which the energy storage device would be heated to the maximum due to the high electrical power flow. Unfavorable heating of the energy storage device before reaching the destination or after traveling the specified distance can thus be avoided, so that a temperature within the charging temperature range that is advantageous for charging is already available at the start of the charging process. This also makes it advantageous to avoid cooling the energy storage device to a temperature within the charging temperature range before charging, which would also take a comparatively long time due to the large thermal mass of the energy storage device.

Adherence to the maximum value can be implemented by the control device by restricting the parameter range of a driving operation parameter to the maximum value, so that the driver can only operate the motor vehicle within the parameter range of the driving operation parameter restricted by the maximum value. Alternatively, the driver can be informed of the determined maximum value, leaving it up to the driver to adhere to the parameter range of the driving operation parameter limited by the maximum value.

The at least one temperature sensor that determines a temperature of the energy storage device can in particular be a temperature sensor that measures the temperature of a battery module of the energy storage device comprising one or more battery cells. In particular, the measured temperatures or cell module temperatures of several temperature sensors, each assigned to a different battery module of the energy storage device, can also be taken into account when determining the maximum value.

According to the invention, it can be provided that a speed of the motor vehicle and/or an acceleration of the motor vehicle are used as driving operation parameters. In particular, driving at a high speed or calling up high accelerations of the motor vehicle lead to a high electrical power flow from the energy storage device and thus to a strong heating of the energy storage device. The maximum value for the parameter range determined by the control device can be used to limit a permissible parameter range for the speed and/or acceleration of the motor vehicle. Consequently, the determined maximum value reduces a maximum permissible speed of the motor vehicle and/or a maximum permissible acceleration of the motor vehicle, so that the parameter range available in each case still has a lower upper limit than in an unrestricted operating state.

In a preferred embodiment of the invention, it can be provided that the control device determines the maximum value if at least one triggering criterion, in particular monitored by the control device, is fulfilled. The use of a triggering criterion advantageously makes it possible that the restriction of the parameter range by the maximum value determined by the control device can be made dependent on the fulfillment of the triggering criterion, thus on the occurrence of a predetermined precondition. This makes it possible for the restriction of the parameter range to be carried out only when it becomes necessary for reaching the temperature within the charging temperature range at the destination or after driving the predetermined distance. Unnecessary restrictions of the parameter range, which would influence the driving capability of the motor vehicle, can thus be advantageously dispensed with.

According to the invention, it may be provided that a distance between a current vehicle position and the destination to be approached is used as the or a triggering criterion, wherein this triggering criterion is fulfilled if the distance falls below a distance limit value. The parameter range is therefore limited by the maximum value determined by the control device if the distance between the current vehicle position and the destination to be approached falls below a predefined distance limit value. The current vehicle position can be determined, for example, via the control device or a navigation device connected to the control device. For example, a distance in an interval between 10 km and 100 km, in particular a distance of 50 km, can be used as the distance limit value.

In a preferred embodiment of the invention, it may be provided that a residual range resulting from a state of charge of the energy storage device is used as the or a triggering criterion, wherein this triggering criterion is fulfilled if the residual range falls below a range limit value. If the residual range resulting from the charge state of the energy storage device falls below the range limit value, it is also foreseeable that the motor vehicle must be charged at the latest after driving a distance corresponding to the residual range. If the available residual range falls below the range limit value, the parameter range can thus be restricted by the control device determining the maximum value so that, depending on the selection of the range limit value within the residual range, but at least after driving a distance corresponding to the complete residual range, a temperature of the energy storage device within the charging temperature range can be achieved as the specified distance. For example, a residual range in an interval between 10 km and 100 km, in particular a residual range of 50 km, can be used as the range limit value.

According to the invention, it can be provided that the motor vehicle has a display device for displaying information to a driver, with operating information indicating the restriction of the driving operation parameter and/or an operating information indicating the maximum value being displayed on the display device after the maximum value has been determined. In this way, the driver of the motor vehicle can be made aware that, for the most efficient charging possible at the destination and/or after covering the specified distance, the determined maximum value for the driving operation parameter, in particular for the speed and/or acceleration of the motor vehicle, should no longer be exceeded. The driver can thus be made aware of a restriction of the driving operation parameter that has already occurred by the display of the operating information, or the maximum value is displayed to them via the operating information so that the driver can decide for them self whether they want to restrict the parameter range of the driving operation parameter to the maximum value for the rest of the journey.

When the speed is used as a driving operation parameter it can be provided according to the invention that the operating information is only displayed if the maximum value is below a permissible value for the driving operation parameter for the current position of the motor vehicle. In this way, it can be avoided that a maximum value for the speed is displayed which is above a speed limit applicable to the current position of the motor vehicle. The permissible value for the driving operation parameter, in particular a permissible maximum speed for motor vehicles, can be determined, for example, by detecting the environment using an environment sensor of the motor vehicle and/or via map data stored in the control device or a navigation device connected to the control device.

According to the invention, it can be provided that the displayed operating information comprises a predicted charging duration determined by the control device and/or a charging duration difference determined by the control device between the charging duration with the predicted temperature within the charging temperature range and a charging duration with, in particular, a maximum permissible temperature of the energy storage device outside the charging temperature range. In this way, the driver of the motor vehicle can be made aware of the time that a subsequent charging process will take at the destination and/or after covering the specified distance if the journey is made with the restricted parameter range of the driving operation parameter. This makes it possible, for example, to provide the driver with further information regarding an advantageous driving style and the duration or time saving of a subsequent charging process in addition to the indication of an available residual range by the operating information.

In addition or alternatively, it can also be indicated what time saving, i.e. what difference in charging time, can be achieved if the route to the destination or the completion of the specified distance is covered with the parameter range for the driving operation parameter limited by the maximum value determined by the control device. The driver can thus be made aware that driving to the destination and/or covering the specified distance at a reduced speed and/or with reduced acceleration will result in a time saving in the subsequent charging process. The charging time or the difference in charging time can refer to complete charging of the energy storage device or to partial charging of the energy storage device, in particular with a high charging power, for example charging the energy storage device to 80%.

In a preferred embodiment of the invention, it may be provided that, when the driver performs an operating action, in particular activating the accelerator pedal, the driving operation parameter is limited to the maximum value in order to change the driving operation parameter beyond the maximum value. In particular, it is possible to limit an acceleration and/or a speed of the motor vehicle. In this way, it is achieved that the parameter range for the driving operation parameter is limited by the motor vehicle itself to the maximum value determined by the control device. This makes it possible for the driver to adhere to the restriction in a comfortable manner and thus to achieve the temperature within the charging temperature range of the energy storage device. A restriction of the driving operation parameter can in particular also take place only for the acceleration, whereby in the case of the speed, as was described previously, only a display of the operating information to the driver takes place, so that the driver them self can decide on the adherence to the maximum value for the parameter range of the speed, i.e. for the maximum speed for reaching an energy storage temperature within the charging temperature range.

According to the invention, it can be provided that the restriction takes place only in the case of some of the operating actions which can be used to change the driving operation parameter and/or as a function of the way in which the operating action is carried out and/or in that the restriction takes place only when a corresponding function is activated on a user interface of the motor vehicle. It is possible, for example, that a restriction to the maximum value is made for some of the operating actions that can be used to change the driving operation parameter, whereas no restriction is made for another part of the operating actions available for changing this driving operation parameter, so that a driver of the motor vehicle can also exceed the maximum value if they deems it necessary. Accordingly, the restriction may also depend on the way in which the operating action is performed. For example, no restriction of an acceleration and/or a speed can be performed when a kickdown of an accelerator pedal of the motor vehicle is performed. The restriction of the parameter range to the maximum value can also only occur when a corresponding function is activated on the user interface of the motor vehicle, so that the driver can activate or end the selection as desired. In particular, the driver can thereby select a restriction of the acceleration and/or a restriction of the speed to the respective maximum value.

In a preferred embodiment of the invention, it may be provided that the control device is set up to perform autonomous driving operation of the motor vehicle, wherein the driving operation parameter is set to be less than or equal to the maximum value during autonomous driving operation. Even in an autonomous driving operation of the motor vehicle, it may be desirable to restrict a parameter range for a driving operation parameter to enable a charging duration of a charging process at the destination. Thus, even during a longer trip in an autonomous driving operation, the shortest possible charging duration and thus the shortest possible total trip duration can be achieved.

For a motor vehicle according to the invention, it is provided that it comprises a control device, at least one electric traction motor, an electric energy storage device operable in an operating temperature range for operating the traction motor, and at least one temperature sensor for determining a temperature of the energy storage device, wherein the control device is designed for carrying out a method according to the invention.

The at least one temperature sensor that determines a temperature of the energy storage device can in particular be a temperature sensor that measures the temperature of a battery module of the energy storage device comprising one or more battery cells. In particular, the motor vehicle may also have a plurality of temperature sensors, each associated with a different battery module of the energy storage device.

All of the advantages and embodiments described above with respect to the method according to the invention apply accordingly to the motor vehicle according to the invention.

BRIEF DESCRIPTION OF THE FIGURES

Further advantages and details of the invention will be apparent from the examples of embodiments described below and from the drawings. These are schematic representations and show.

DETAILED DESCRIPTION

Figure 1:
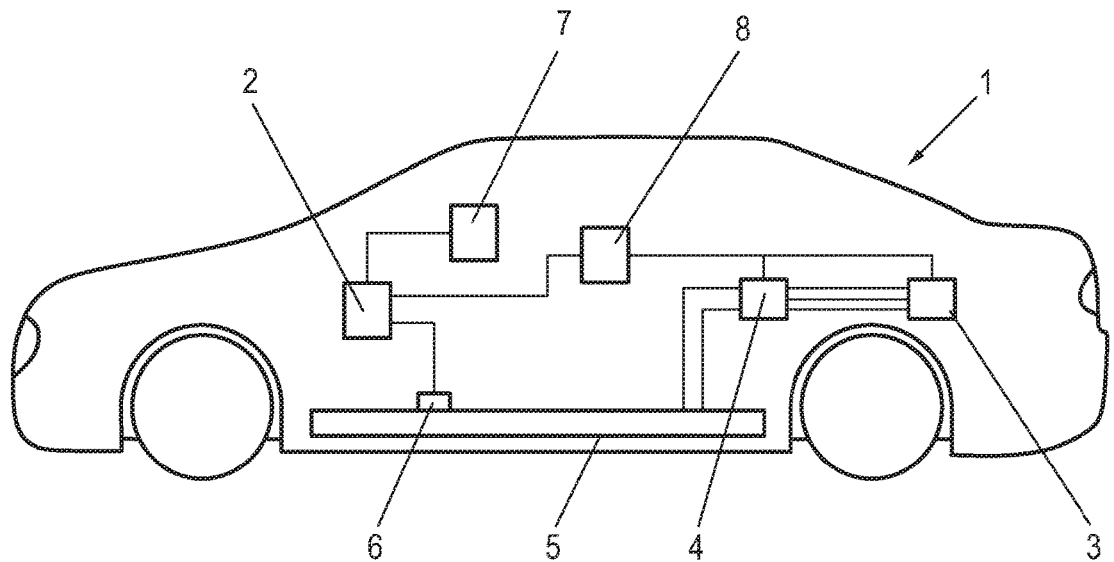
FIG. 1 an embodiment of a motor vehicle according to the invention.

FIG. 1 shows an embodiment example of a motor vehicle 1. The motor vehicle comprises a control device 2 and an electric traction motor 3, which can be operated via power electronics 4 of the motor vehicle 1 by an electric energy storage device 5 of the motor vehicle 1 in the form of a battery. Furthermore, the motor vehicle 1 comprises at least one temperature sensor 6, with which a temperature of the energy storage device 5 can be determined. The temperature sensor 6 is connected to the control device 2 and determines, for example, the temperature of a battery module of the energy storage device 5. The control device 2 is further connected to a display device 7 of the motor vehicle 1 for displaying information to a driver of the vehicle 1.

Furthermore, the control device 2 can communicate with another control unit 8, for example an engine control device for operating the traction engine 3 and/or the power electronics 4. The connection between the temperature sensor 6 and the control device 2 and/or the communication of the control device 2 with the display device 7 and/or the further control unit 8 can take place, for example, via a data bus of the motor vehicle 1.

The control device 2 is designed to determine, as a function of a current temperature of the energy storage device 5 determined by the temperature sensor 6, a maximum value for a parameter range of a driving operation parameter of the motor vehicle 1 in such a way that, after a destination known to the control device 2 has been approached and/or after a journey over a predetermined distance with the driving operation parameter restricted by the maximum value of the parameter range, a predicted temperature of the energy storage device 5 lies within a charging temperature range of the energy storage device 5. It is also possible that the temperatures, determined by several temperature sensors 6, each assigned to a different battery module of the energy storage device 5, are taken into account when determining the maximum value. To predict the temperature of the energy storage device 5, a calculation rule and/or a model of the motor vehicle 1 for predicting the temperature of the energy storage device 5 as a function of the at least one driving operation parameter can for example be stored in the control device 2.

In this case, the charging temperature range represents a subrange of the operating temperature range of the energy storage device 5, wherein the charging temperature range comprises at least one temperature with a charging power maximum for charging the energy storage device 5. The operating temperature range of the energy storage device may, for example, be between −10° C. and 65° C., wherein the charging temperature range may, for example, be between 10° C. and 50° C. or between 10° C. and 60° C. The exact limits of the operating temperature range and/or the charging temperature range may vary depending on the embodiment of the energy storage device 5.

Figure 2:
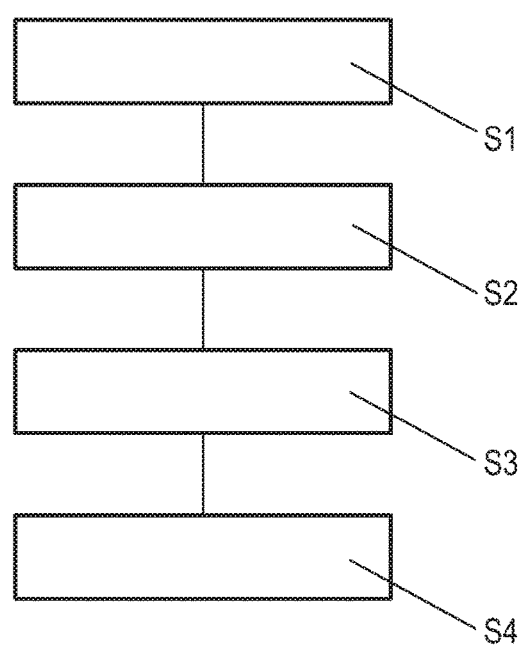
FIG. 2 a flow diagram of an embodiment example of a method according to the invention.

FIG. 2 shows a flowchart of an embodiment example of the method, which can be performed by the control device 2, for determining the maximum value for the parameter range of the driving operation parameter of the motor vehicle 1. The driving operation parameter may be, for example, an acceleration and/or a speed of the motor vehicle 1. In particular, driving at high speeds and/or calling up high acceleration powers for the electric traction motor 3 leads to a high energy draw from the energy storage device 5. This high energy withdrawal from the energy storage device 5 causes the energy storage device 5 to heat up. In particular during longer journeys at higher speeds and/or during frequent calling up of high acceleration power, a temperature of the energy storage device 5 can thereby rise to a value above the intended charging temperature range in which at least one temperature with a charging power maximum lies.

In order to prevent a charging process of the motor vehicle 1 with an unfavorable temperature of the energy storage device 5, i.e. a temperature outside the charging temperature range, the control device 2 determines a maximum value for the acceleration and/or the speed of the motor vehicle 1 in a step S1 when at least one triggering criterion is met. This maximum value is determined in such a way that, when the motor vehicle 1 is driven to a destination known to the control device 2 and/or when a predetermined distance is traveled, for example a still available range of the motor vehicle, with the parameter range for the driving operation parameter limited by the maximum value, the temperature of the energy storage device 2 at the destination or after traveling the distance lies within the charging temperature range.

A distance between a current vehicle position and the destination to be approached can be used as a first triggering criterion, wherein this triggering criterion is fulfilled if the distance falls below a distance limit value. A destination to be approached can be entered, for example, in a navigation device (not shown here) of the motor vehicle 1 and transmitted to the control device 2, so that the destination is known to the control device 2. Accordingly, a current vehicle position can also be determined and made known to the control device 2, wherein the control device 2 can determine the fulfillment of the triggering criterion, i.e., the distance between the current vehicle position and the destination location to be approached. If the distance falls below a distance limit value stored in the control device 2, in particular in an interval between 10 km and 100 km, e.g. a distance of 50 km, the control device 2 considers the triggering criterion to be fulfilled and the determination of the maximum value for the parameter range is carried out.

A residual range resulting from a current state of charge of the energy storage device 5 can be used as a second triggering criterion. The second triggering criterion is regarded as fulfilled by the control device 2 if the remaining range falls below a remaining range limit value. For example, a residual range in an interval between 10 km and 100 km, for example of 50 km, can be used as a range limit value. The control device 2 may, for example, be connected to the energy storage device 5 and itself be designed to evaluate a state of charge and/or a remaining range resulting from the state of charge. It is also possible that this type of determination is performed by the further control unit 8 or another device of the motor vehicle 1, wherein the state of charge and/or the remaining range of the motor vehicle 1 resulting from the state of charge of the energy storage device 5 are transmitted to the control device 2.

If at least one of the trigger criteria in step S1 is satisfied, the maximum value for the parameter range of the driving operation parameter of the motor vehicle 1 is determined in step S2. It is possible that a maximum value for a parameter range of a speed of the motor vehicle 1 and a further maximum value for a parameter range of an acceleration of the motor vehicle 1 are determined in this case. The maximum value or values are determined in this case in such a way that, after an approach to the destination known to the control device 2 and/or after a journey over a predetermined distance, in particular over an available remaining range, with the driving operation parameter restricted by the maximum value of the parameter range, in particular a speed restricted by the maximum value of the parameter range and an acceleration restricted by the maximum value of the corresponding parameter range, a predicted temperature of the energy storage device 5 lies within the charging temperature range of the energy storage device 5.

After the at least one maximum value is determined, in step S3, an operating information is displayed on the display device 7, wherein the operating information describes the restriction of the driving operation parameter and/or a the maximum value of this restriction. On the display it can be shown, for example, that a restriction of the current speed of the motor vehicle to 110 km/h for the next 20 km or for the next 10 minutes is necessary in order to maintain a temperature of the energy storage device 5 within the charging temperature range when reaching a destination or after driving the 20 km or the 10 minutes.

Also, a restriction of the parameter range of an acceleration of the motor vehicle 1 can be made apparent to a driver of the motor vehicle 1 by displaying the operating information on the display device 7. The maximum values determined by the control device in step S2 can be displayed to the driver via the display device 7, or, in addition or as an alternative to the display of the operating information, the driving operation of the motor vehicle 1 can be restricted to the maximum value or values. For this purpose, for example, the control device 2 can transmit the determined maximum value or values to the control unit 8 which operates the engine 3 and/or the power electronics 4. The control unit 8 can then comply with the maximum values determined by the control device 2 during a driving operation of the motor vehicle 1.

It is possible that a restriction of the speed of the driving operation parameter is displayed as operating information only if the determined maximum value is below a permissible value for the speed for the current position of the motor vehicle 1. For example, the preceding exemplary restriction of the speed to 110 km/h can be displayed to the driver only if, for example, the driver is driving on a highway on which a higher speed of, for example, 130 km/h is permissible. If the motor vehicle 1 is traveling on a road with a lower permissible speed, for example in a town or city, where a maximum speed of 50 km/h applies, the display of the operating information on the display device 7 can be omitted.

In addition, it is possible that the displayed operating information indicates a predicted charging duration determined by the control device 2 and/or a charging duration difference at the display device 7. In this case, the charging duration difference can be indicated between the charging duration of a charging process which is carried out with the predicted temperature lying within the charging temperature range and the charging duration of a charging process which is carried out with a maximum permissible temperature of the energy storage device lying outside the charging temperature range but within the operating temperature range. The charging duration can refer to a complete or a partial charging of the energy storage device 5, in particular a partial charging of the energy storage device 5 possible with a maximum possible charging power.

In this way, the driver can be made aware of the charging duration to be expected during a subsequent charging stop if the further journey is carried out in compliance with the maximum values for speed and/or acceleration. In addition or alternatively, the time saved during the subsequent charging process can also be displayed. For example, the driver can be shown that a reduction of a charging process up to 80 capacity of the energy storage device 5 a time reduction of 15 minutes can be achieved when driving to the destination or traveling the distance to the destination at a maximum speed of 110 km/h.

It is possible that the respective maximum values used to restrict the parameter range are not only displayed to the driver via the display device 7, but that a restriction to the maximum values for the speed and acceleration also takes place when an operating action such as the actuation of an accelerator pedal is performed. Thereby, when the driver changes the driving operation parameter beyond the maximum value, a restriction of the driving operation parameter to the maximum value can take place. This can be done, for example, by the control device 2 and/or the further control unit 8 when the driver operates an accelerator pedal of the motor vehicle 1.

In this case, the restriction can only be carried out for a part of the operating actions that can be used to change the driving operation parameter. It is also possible that the restriction depends on the way in which the operating action is performed, so that, for example, when a kickdown is performed on an accelerator pedal, the restriction of the parameter range for the speed and/or acceleration by the maximum value is removed again in order to be able to make the maneuverability of the motor vehicle 1 fully available in such a case. The automatic setting of the maximum values as limit values for the driving operation parameters by the control device 2 and/or by the control unit 8 can in particular also take place only if the driver has activated a corresponding function on a user interface of the motor vehicle 1.

In addition to a manual driving operation in which the restrictions of the driving operation parameters are presented to the driver and/or are taken into account for the performance of operating actions, a restriction of the driving operation parameters can also be performed accordingly in the case of a motor vehicle which is designed for autonomous driving operation. To this end, for example, the control unit 8 of the motor vehicle 1 can be designed to carry out autonomous driving operation, wherein the maximum values determined by the control device 2 is transmitted to the control unit 8 and being observed by the latter during autonomous driving operation.

It is possible that the control device 2 and the control unit 8 are implemented as a common control device and/or that the functions described above are performed in a control device comprising one and several separate control units.

Determining the maximum values for the driving operation parameters of the motor vehicle 1 enables the temperature of the energy storage device 5 during a charging stop to be within the charging temperature range in which the most efficient charging of the energy storage device 5 is possible. As a result, the charging power to be obtained with the temperature within the charging temperature range can be maximized, so that the time duration of the charging process can be reduced. Furthermore, charging the energy storage device 5 with a temperature within the charging temperature range has the advantage that battery aging of the energy storage device 5 can be reduced.

Depending on the wishes of the driver, the restriction to the maximum values can be carried out by the motor vehicle, so that the operating actions are restricted accordingly and a throttling of the speed to be achieved by the motor vehicle 1 and/or an acceleration to be achieved is carried out. It is also possible to display the respective maximum values, in particular for the speed, so that the driver can decide for them self, on the basis of the displayed operating information, whether they wishes to reduce the speed to the maximum value and thus reduce the temperature of the energy storage device 5 to a temperature within the charging temperature range.

The invention claimed is:

1. A method for determining a maximum value for a parameter range of a driving operation parameter of a motor vehicle, wherein the motor vehicle comprises a control device, a traction motor, an energy storage device, and a temperature sensor, the method comprising:
   determining, with the temperature sensor, a temperature of the energy storage device;
   determining, with a control device, whether a predicted temperature of the energy storage device lies within a charging temperature range, wherein the charging temperature range is a subrange of an operating temperature range and includes at least one temperature with a charging power maximum for charging the energy storage device;
   displaying, with a display device, a difference between a predicted charging duration for a temperature within the charging temperature range and a predicted charging duration for a temperature above the charging temperature range but within the operating temperature range; and
   throttling, with the control device, a speed of the motor vehicle to reduce a temperature of the energy storage device within the charging temperature range.

2. The method according to claim 1, wherein at least one of a speed of the motor vehicle and an acceleration of the motor vehicle is used as driving operation parameters.

3. The method according to claim 1, further comprising:
   determining, with the control device, the maximum value when at least one triggering criterion is fulfilled.

4. The method according to claim 3, wherein a distance between a current vehicle position and a destination to be approached is used as a triggering criterion and the triggering criterion is fulfilled after the distance falls below a distance limit value.

5. The method according to claim 3, wherein a residual range of distance resulting from a state of charge of the energy storage device is used as a triggering criterion, wherein the triggering criterion is fulfilled after the residual range falls below a range limit value.

6. The method according to claim 1, further comprising:
   displaying, on the display device, operating information after the maximum value has been determined.

7. The method according to claim 6, further comprising:
   when speed is used as the driving operation parameter, displaying, on the display device, the operating information only after the maximum value is below a threshold for the driving operation parameter for a current position of the motor vehicle.

8. The method according to claim 1, further comprising:
   when a driver activates an accelerator pedal, limiting, with the control device, the driving operation parameter to the maximum value.

9. The method according to claim 8, further comprising:
   displaying, to the driver, restriction of the driving operation parameter.

10. The method according to claim 1, further comprising:
    performing, with the control device, an autonomous driving operation of the motor vehicle, wherein the driving operation parameter is set to be less than or equal to the maximum value during autonomous driving operation.

11. A motor vehicle comprising:
    an electric traction motor;
    an energy storage device configured to operate in an operating temperature range for operating the electric traction motor;
    a temperature sensor configured to determine a temperature of the energy storage device;
    a control device configured to
    determine whether a predicted temperature of the energy storage device lies within a charging temperature range, wherein the charging temperature range is a subrange of an operating temperature range and includes at least one temperature with a charging power maximum for charging the energy storage device,
    throttle speed of the motor vehicle reduce a temperature of the energy storage device within the charging temperature range; and
    a display device configured to display a difference between a predicted charging duration for a temperature within the charging temperature range and a predicted charging duration for a temperature above the charging temperature range but within the operating temperature range.

12. The method according to claim 2, further comprising:
    determining, with the control device, the maximum value when at least one triggering criterion monitored by the control device, is fulfilled.

13. The method according to claim 2, wherein a residual range of distance resulting from a state of charge of the energy storage device is used as a triggering criterion, wherein the triggering criterion is fulfilled after the residual range falls below a range limit value.

14. The method according to claim 2, further comprising:
    displaying, on the display device, operating information after the maximum value has been determined.

15. The method according to claim 3 further comprising:
    displaying, on the display device, operating information after the maximum value has been determined.

16. The method according to claim 4, further comprising:
    displaying, on the display device, operating information after the maximum value has been determined.

17. The method according to claim 5, further comprising:
    displaying, on the display device, operating information after the maximum value has been determined.

18. The method according to claim 3, further comprising:
    when speed is used as a driving operation parameter, displaying, on the display device, operating information only after the maximum value is below a value for the driving operation parameter for a current position of the motor vehicle.

19. The method according to claim 2, further comprising:
    when a driver activates an accelerator pedal, limiting, with the control device, the driving operation parameter to the maximum value.

* * * * *